United States Patent Office 3,458,685
Patented July 29, 1969

3,458,685
ARC WELDING ELECTRODE
Keizo Tezuka, 1090 Toyoda, Hinomachi Minamitama-gun, Tokyo, Japan, and Takuro Kobayash, 3–23, Nagamine, Nagamachi, Sendaishi, Japan
No Drawing. Filed Aug. 3, 1965, Ser. No. 494,488
Claims priority, application Japan, Aug. 6, 1964, 39/44,137; Aug. 8, 1964, 39/45,159
Int. Cl. B23k 35/34
U.S. Cl. 219—146                                      9 Claims

ABSTRACT OF THE DISCLOSURE

A steel welding electrode for unshielded electrode arc welding which includes carbon, manganese and silicon and to which zirconium is added as a de-oxidizer in amounts up to 0.8% and to which further an element consisting of the following Ti, Ce, Hf, Be, U, Al, B, Ta, Nb, La, Mg, Ca or V is added as a denitrogenizing element.

---

The present invention relates to welding electrode steel wire materials or other steel materials such as studs used for non-shielded consumable electrode arc welding, and to methods of non-shielding consumable electrode arc welding. Non-shielded consumable electrode arc welding described herein, is such welding as uses bare solid steel wire as the consumable electrode, without covering, flux, cored flux or shielded gas.

When arc welding is carried out in the air, using bare steel wire or studs as the consumable electrode, a number of air-cells are formed in the welded metal, so that good welds cannot be obtained. The reason is that molten drops of electrode wire from the end of the electrode or molten welded metal combine with the base metal, get in touch with the air and absorb a large amount of nitrogen and oxygen from the air, which gases are not all discharged and upon being condensed form air-cells in the welded metal.

In the first stage of arc welding with bare steel wire as the consumable electrode, used to be employed which, however, could not solve the problem to avoid these air-cells. In the next stage the shielded metal arc welding method, the electrode wire was covered with a covering agent. For example, a cored welding bar, which is bare steel but contains an arc stabilizer or a material used for molten metal in its core (in Germany called "Seelene-lektrode") has been used with some success. Further, when using bare steel wire as the consumable electrode, welded metals with excellent mechanical characteristics, containing no air-cells, were obtained by the development of such welding methods as Submerged Arc Welding, wherein granular flux to avoid the harm of the air was scattered in advance upon the welded portion and next arc welding was carried out inside the fairly complete cover of that flux. Another method was the Gas Shielded Metal Arc Welding, wherein certain gases were directed toward and around the arc and welding was carried out inside this gas cover. Moreover, concerning studs it is well known that it is effective to use studs containing some Mn, Si or other deoxidizers in order to get rid of the harmful oxygen which affects the welding steel.

These methods all assume that there is no suitable way to avoid the harmful effects of nitrogen and oxygen which affect the molten steel, except by covering the molten steel with covering agents, flux or shield gases in order to avoid the contact of the high temperature molten steel with the air.

Thus it would be economically important if welded portions with good mechanical characteristics could be obtained by non-shielded arc welding using bare solid wire in the air, which would simplify welding apparatus and operation.

In non-shielded arc welding by bare solid wire or stud, it is necessary to pay attention to the effects of nitrogen and oxygen, in order to avoid air-cells in the molten metals. Especially in case of studs, welding is carried out by pressing the stud upon the base metal, which then melts because of which the influence of nitrogen and oxygen upon the base metal cannot be negligible.

It is well known to make electrode wire or flux containing some Mn, Si or other deoxidizers in order to effectively avoid the harmful action of oxygen on the molten steel.

However, there has been no method to avoid the harmful influences of nitrogen once it is incorporated in the molten steel at the time of welding, except breaking the contact between the molten steel and the air, by the methods described above.

The inventors of the present invention, turning to such elements as Zr and Ti, which have a strong affinity for nitrogen and oxygen, have discovered that when non-shielded consumable electrode arc welding is carried out by using bare solid electrode steel wire containing those elements, good welds can be obtained since these elements act as deoxidizers and denitrogenizers, and non-shielded consumable electrode arc welding can be carried out by using bare solid electrode steel wire containing not more than 0.25% and more than 2% of Zr, or of Zr and Ti together.

According to the studies of the inventor, it was found that the effective elements to be included in the electrode steel wire for non-shielded consumable electrode arc welding are not only Zr and Ti but also Ce, Hf, Be, U, Al, B, Ta, Nb, La, Mg, Ca, V, etc., all of which elements have a strong affinity for nitrogen.

When non-shielded arc welding is carried out by using electrode steel wire containing those elements, the denitrogenization is accomplished effectively since these elements combine with the nitrogen to form nitrides, a part of which is separated as slag. And according to the studies of the inventor, good welds can be obtained by non-shielded stud welding, when using studs containing one or more of those elements having strong affinity for nitrogen. In these cases, it was found that excellent mechanical characteristics can be obtained by using jointly a small amount of each element.

It was found also that, when using jointly a suitable amount of deoxidizing elements together with denitrogenizing elements, a comparatively small amount of denitrogenizing elements exercises sufficient denitrogenizing effect due to the decrease of the oxidized waste.

It is one of the aspects of the present invention that, by using, jointly with Zr which is the most effective element for the denitrogenizing function, as the base, one or more of elements having a strong affinity for nitrogen, to wit, Ti, Ce, Hf, Be, U, Al, B, Ta, Nb, La, Mg, Ca, V, etc. (hereinafter called "denitrogenizing elements"), multiple effects are accomplished.

It is another aspect that, when a suitable amount of deoxidizing elements is used jointly with denitrogenizing elements, a comparatively small amount of denitrogenizing elements can exercise the sufficient denitrogenizing effect due to the decrease of the oxidized waste of denitrogenizing elements and the obtained mechanical characteristics are excellent, and therefore suitable amounts of Mn and Si as denitrogenizing elements can be established. That is to say, the suitable amount of Mn, to be contained in electrode steel wire or stud is found to be less than 5.0%, and the suitable amount of Si therein is less than 1.5%.

When Mn and Si are contained in electrode steel wire to the extent of the above described amounts, a comparatively small amount of Zr, or of a composition of Zr and one or more of other denitrogenizing elements, can exercise sufficient denitrogenizing effects. That is to say, arc welding is carried out in air using bare solid steel wire or stud, which is alloyed in such a manner that the wire or stud contains Mn and Si to the above extent and less than 1.0% of Zr, or, less than 1.0%, of the composition of Zr and one or more of above described denitrogenizing elements. Welds with excellent mechanical characteristics without any air-cells can thus be obtained.

Example I.—Non-shielded arc welding steel wire

Non-shielded arc welding was carried out, employing, as consumable electrodes (1) the electrode steel wire of the present invention which was prepared by making steel with less than 0.3% of carbon and containing as strong denitrogenizing elements, Zr or a composition of Zr and one or more of above described denitrogenizing elements, and further containing in order to decrease oxidized waste of denitrogenizing elements, a suitable amount of Mn and Si as deoxidizing elements (2) electrode steel wire of a chemical composition outside this invention, for purpose of comparisons.

The results are shown in FIGURES 1–3. A number of sets of steel in various chemical compositions were employed, and since the results can be shown easily and simply by varying contents of Mn, Si and denitrogenizing elements, FIGURE 1 shows chemical composition ranges.

FIGURE 1.—CHEMICAL COMPOSITION RANGES OF CONSUMABLE ELECTRODE WIRE GROUPS EMPLOYED IN NON-SHIELDED ARC WELDINGS

| Electrode groups | C, percent | Mn, percent | Si, percent | Zr, percent | One or more of denitrogenizing elements, Ti, Ce, Hf, B, Al, U, La, Ta, Nb, Mg, Ca, V, etc. Total, percent | Zr and one or more of denitrogenizing elements. Total, percent | Remarks |
|---|---|---|---|---|---|---|---|
| 1 | 0.05–0.15 | 0.5–0.8 | 0.03–0.05 | | | | Ordinary steel wire. |
| 2 | 0.02–0.20 | 0.80–1.60 | 0.10–0.3 | 0.20–0.30 | | | Present invention. |
| 3 | 0.02–0.20 | 0.80–1.60 | 0.10–0.30 | 0.5–0.60 | | | Do. |
| 4 | 0.02–0.20 | 0.80–1.60 | 0.10–0.30 | 0.8–1.0 | | | Do. |
| 5 | 0.02–0.20 | 0.80–1.60 | 0.10–0.30 | 0.35–0.5 | Each element <0.5 | 0.5–1.0 | Do. |
| 6 | 0.02–0.20 | 0.80–1.60 | 0.10–0.3 | 0.25–0.3 | Each element <0.3 | 0.26–0.35 | Do. |
| 7 | 0.02–0.20 | 0.80–1.60 | 0.10–0.30 | | do | 0.4–0.5 | Do. |
| 8 | 0.02–0.20 | 0.80–1.60 | 0.10–0.30 | 0.15–0.24 | do | 0.2–0.35 | Do. |
| 9 | 0.02–0.20 | 0.80–1.60 | 0.10–0.30 | 0.15–0.24 | do | 0.4–0.5 | Do. |
| 10 | 0.02–0.20 | 0.80–1.60 | 0.10–0.30 | 0.05–0.14 | do | 0.2–0.35 | Do. |
| 11 | 0.02–0.20 | 0.80–1.60 | 0.10–0.30 | 0.05–0.14 | do | 0.4–0.5 | Do. |
| 12 | 0.02–0.20 | 0.80–1.60 | 0.35–0.6 | 0.15–0.24 | do | 0.2–0.35 | Do. |
| 13 | 0.02–0.20 | 0.4–0.7 | 0.1–0.3 | 0.15–0.24 | do | 0.2–0.35 | Do. |
| 14 | 0.02–0.20 | 2.0–3.0 | 0.1–0.3 | 0.15–0.24 | do | 0.2–0.35 | Do. |
| 15 | 0.02–0.20 | 0.8–2.0 | 0.03–0.09 | 0.15–0.24 | do | 0.2–0.35 | Do. |
| 16 | 0.02–0.20 | 0.8–2.0 | 0.65–1.20 | 0.15–0.24 | do | 0.2–0.35 | Do. |
| 17 | 0.02–0.20 | 5.5–7.0 | 0.10–0.30 | 0.15–0.24 | do | 0.2–0.35 | Other than present invention. |
| 18 | 0.02–0.20 | 1.0 | 1.8–2.5 | 0.15–0.24 | do | 0.2–0.35 | Do. |
| 19 | 0.02–0.20 | | 0.25 | >1.0 | | | Do. |
| 20 | 0.02–0.20 | 0.8–1.6 | 0.1–0.3 | >0.5 | >0.5 | >1.0 | Do. |

FIGURE 2.—WELDING CONDITIONS (DCRI) AND DEGREE OF AIR-CELL OCCURRENCES (ACCORDING TO JISZ2341), AT THE TIME OF NON-SHIELDED ARC WELDING USING VARIOUS ELECTRODE STEEL WIRES (ALL 1.6 MM IN DIAMETER).

| | Arc voltage, V | Welding current, A | Classification of Arc-cell occurrences | Remarks |
|---|---|---|---|---|
| Electrode groups: | | | | |
| 1 | 22 | 200 | Rejected | Ordinary steel wire. |
| 2 | 22 | 200 | Over Class 2 | Present invention. |
| 3 | 22 | 200 | do | Do. |
| 4 | 22 | 200 | Over Class 4 | Do. |
| 5 | 22 | 200 | do | Do. |
| 6 | 22 | 200 | Over Class 2 | Do. |
| 7 | 22 | 200 | Over Class 3 | Do. |
| 8 | 22 | 200 | Over Class 2 | Do. |
| 9 | 22 | 200 | Over Class 3 | Do. |
| 10 | 22 | 200 | Over Class 2 | Do. |
| 11 | 22 | 200 | Over Class 3 | Do. |
| 12 | 22 | 200 | do | Do. |
| 13 | 22 | 200 | Over Class 5 | Do. |
| 14 | 22 | 200 | Over Class 4 | Do. |
| 15 | 22 | 200 | Over Class 5 | Do. |
| 16 | 22 | 200 | Over Class 4 | Do. |
| 17 | 22 | 200 | Rejected | Out of present invention. |
| 18 | 22 | 200 | do | Do. |
| 19 | 22 | 200 | do | Do. |
| 20 | 22 | 200 | do | Do. |

FIGURE 3.—MECHANICAL CHARACTERISTICS OF WELDED METALS OBTAINED BY NON-SHIELDED ARC WELDING, USING VARIOUS ELECTRODE STEEL WIRE GROUPS

| Electrode groups | Tensile strength, kg./mm. | Expansibility, percent | Percussion value | Remarks |
| --- | --- | --- | --- | --- |
| 1 | 25.2–30.3 | 2.5–5.0 | 0.5–1.2 | (1) |
| 2 | 50.5–56.2 | 21.3–28.0 | 3.5–4.0 | (2) |
| 3 | 55.3–59.5 | 17.2–23.2 | 3.3–4.5 | (2) |
| 4 | 57.5–63.2 | 17.0–18.5 | 3.6–4.6 | (2) |
| 5 | 52.5–59.3 | 17.0–19.5 | 3.5–4.8 | (2) |
| 6 | 50.5–56.2 | 18.1–23.5 | 4.5–7.3 | (2) |
| 7 | 53.6–59.3 | 17.0–18.3 | 3.6–5.2 | (2) |
| 8 | 51.5–56.2 | 18.2–27.8 | 4.8–9.3 | (2) |
| 9 | 54.3–58.7 | 17.1–22.0 | 3.8–5.5 | (2) |
| 10 | 50.8–57.1 | 17.3–24.5 | 4.3–8.5 | (2) |
| 11 | 53.8–57.8 | 17.4–19.3 | 3.5–5.8 | (2) |
| 12 | 52.3–58.5 | 17.0–20.2 | 3.9–6.3 | (2) |
| 13 | 50.5–55.8 | 17.0–20.2 | 3.8–5.5 | (2) |
| 14 | 51.8–60.0 | 17.4–20.0 | 3.6–5.6 | (2) |
| 15 | 50.1–62.2 | 17.5–22.0 | 3.8–4.2 | (2) |
| 16 | 54.1–58.9 | 17.6–24.1 | 3.5–5.2 | (2) |
| 17 | 58.9–62.5 | 16.7–17.2 | 2.0–4.7 | (3) |
| 18 | 48.1–52.2 | 15.0–17.2 | 2.8–4.5 | (4) |
| 19 | 51.4–57.3 | 16.5–20.0 | 2.1–4.0 | (5) |
| 20 | 51.0–55.6 | 15.5–22.1 | 2.0–4.7 | (5) |

[1] All tensile strength, expansibility and percussion value, Low.
[2] Tensile strength, expansibility and percussion value, Excellent.
[3] Tensile strength is excellent but expansibility and percussion value are not high.
[4] Mechanical characteristics are wholly inferior.
[5] Expansibility and percussion value are not excellent.

Group 1 is ordinary steel wire. Groups 2–4 are embodiments of the present invention, which contain 0.1–0.3% of Si, and Zr alone for a denitrogenizing element whose contents are varied. Group 5 is that embodiment of the present invention which contains a large amount of Zr as a denitrogenizing elements, and with it contains less than 0.5% of one or more of other denitrogenizing elements, the total content of the composition of Zn and other denitrogenzing elements being 0.5–1.0%.

Group 6 is another embodiment of the present invention, which contains a somewhat larger amount of Zr as a denitrogenizing element, and with it contains one or more of other denitrogenizing elements in an amount of less than 0.3%, the total content of the composition of Zr and others being 0.26–0.35%. An example of this group is that of 0.1% of carbon, 1.10 of Mn, 0.28 of Si, 0.26 of Zr, 0.05 of Ti, and 0.015 of Al, and that of 0.12 of carbon, 1.08 of Mn, 0.26 of Si, 0.28 of Zr, 0.05 of Ce and 0.013 of Al. That is to say, as denitrogenizing elements, Zr, Ti and Al are used in the former example, and Zr, Ce and Al are used in the latter.

Groups 7–11 are other embodiments of the present invention, contents of Mn and Si being the same as those of Group 6 but the amount of denitrogenizing element being different from that of Group 6.

Group 12 may be compared to Group 8, though the contents of denitrogenizing elements are the same as those of Group 8, but the content of Si is a little larger than that of Group 8.

Groups 13, 14, 15 and 16 are embodiments of the present invention, in which the contents of Mn and Si are somewhat different from those of above described group.

Group 17 contains a larger amount of Mn in comparison to that of Group 14, and Group 18 contains a larger amount of Si comparative to that of Group 16. Group 19 contains a larger amount of Zr comparative to Group 4, and Group 20 contains an excessive amount of the total content of denitrogenizing elements. These four groups are all outside the present invention.

Employing steel wire of these groups, weldings were carried out by an automatic welder with a selenium rectifier and a stabilized voltage direct current welder. The welded metals were put on rimmed mild steel boards and air-cells occurrences were measured and compared. The following are the results.

Non-shielded arc welding with normal steel wire of Group 1 naturally forms innumerable air-cells.

Very few air-cells are formed in case of Groups 2 and 3. Somewhat more air-cells are formed in case that the denitrogenizing elements are present at the upper extent in Groups 4 and 5, but the cells were negligible in actual use.

No air-cells were formed in case of Group 6. Some air cells are likely to be formed (about 5 air cells in 10 cm. of welded metal), in case that the total content of denitrogenizing elements is nearly 0.50% in Group 7, but the weld is fairly good.

No air-cells are formed in case of Group 8. Some air-cells are likely to be formed in case that the total content of denitrogenizing elements is nearly 0.50% in Group 9 as in the case of Group 7, and this is the same in case of Group 11. That caused us to define the upper limitation of the total content of all denitrogenizing elements to be 1.0% in the present invention.

No air-cells are formed in case of Group 10, and in case of Group 11 the same result occurred as Group 7 or 9, as described above.

Group 12 is the same as Group 8 except for the content of Si, more air-cells being likely to be formed than in case of Group 8.

Air-cells are somewhat likely to be formed, in case of Groups 13 to 16, with varying contents of Mn and Si. Groups 17 to 20 are outside the present invention. Air-cells are very ilkely to be formed, the contents of Mn and Si being excessive.

FIGURE 2 illustrates graphically the above explanation, and FIGURE 3 shows the result of measurements of mechanical characteristics of welded metals using electrode steel wires.

There must be a certain standard to determine the availability of welding steel wire. The minimum standard values of mechanical characteristics of welded metals by shielded metal weldings, are, at present, more than 43 kg./mm.$^2$ of tensile strength, more than 17% of expansibility (in case of highly oxidized titanium shielded welding wire), and 3.5 kg. m./cm.$^2$ of percussion value (in case of illuminate shielded welding wire). Therefore, in this non-shielded arc welding, those embodiments which satisfy these values are regarded available.

In case of Group 1, tensile strength, expansibility and the percussion value are all lower than the standard. In case of Groups 2–5, tensile strength, expansibility and the percussion value are still excellent. In case of Group 6 these values are all above the standards. In case of Group 7 these values are somewhat satisfactory even though expansibility is a little worse than the total content of denitrogenizing elements is nearly 0.5%.

In case of Group 8, mechanical characteristics are the most excellent, not inferior to mechanical characteristics of welding with shielded welding wire.

In case of Group 9, as Group 7, those values are somewhat satisfactory, though expansibility is a little worse when the total content of denitrogenizing elements is nearly 0.50%.

In case of Group 10 all values are above the standards, and in case of Group 11 the results are similar to those in case of Group 7 or 9.

Content of Si in Group 12 is larger than that of Group 8, and it is likely that the larger the content of Si the smaller the expansibility. However, it is negligible for actual use.

Groups 13 to 16 are classified according to contents of Mn and Si, but mechanical characteristics are above the standard, regarded suitable for non-shielded arc welding steel wire and these groups are therefore included in the present invention.

Groups 17 to 20 are classified according to contents of Si, Mn and denitrogenizing elements, which are all not suitable for actual use, their mechanical characteristics being too low.

It is obvious from the above results that a good weld with excellent mechanical characteristics without aircells can be obtained by carrying out non-shielded arc welding which employs, as consumable electrode, such as bare solid steel wire, a material containing less than 0.3% of carbon, less than 5.0% of, preferably from 0.8 to 2.0% of Mn, and less than 1.5% of, preferably from 0.1 to 0.6% of, if necessary from 0.10 to 0.30% of Si, and also containing, as denitrogenizing elements, from 0.1 to 1.0% of Zr or from 0.1 to 1.0% of the composition of Zr and one or more of Ti, Ce, Hf, Be, U, Al, B, Ta, Nb, La, Mg, Ca, and V.

Example III.—Non-shielded arc welding stud materials

Good welds with few or no air-cells can be obtained by making steel with less than 1.7% of carbon, containing as denitrogenizing elements, from 0.1 to 1.5% of Zr or the total of Zr and one or more of above described denitrogenizing elements, and also containing as deoxidizing elements in order to decrease the oxidized waste of above denitrogenizing elements, less than 5.0% of Mn and less than 1.5% of Si.

In case of stud materials, base metals melt to some extent, as described above, and in order to avoid the effects of nitrogen and oxygen upon the base metals, contents thereof must be larger, as described above, than in case of steel wire.

However, it is not preferable to exceed the above described composition ranges, because as in case of steel wire, the viscosity of molten steel is decreased and the discharge of gases is impeded with the effect that air-cells are likely to be formed.

Stud weldings were carried out, employing stud materials of the present invention, and stud materials of other compositions than the present invention for the purpose of the comparisons.

The results are shown in FIGURES 4 and 5. FIGURE 4 shows the chemical composition of the stud materials and FIGURE 5 shows the size of the stud materials, welding conditions and numbers of air-cells in welded portions.

In these welding experiments stud materials of various chemical compositions were employed, and, since the results can be easily and simply shown by contents of denitrogenizing elements, Mn and Si, FIGURES 1 and 2 show chemical composition ranges in varying stud materials into groups.

FIGURE 4.—CHEMICAL COMPOSITIONS OF STUD MATERIALS GROUPS EMPLOYED IN STUD WELDINGS

| Stud groups | C, percent | Mn, percent | Si, percent | Zr and one or more of denitrogenizing elements, Total percent [1] | Remarks |
|---|---|---|---|---|---|
| 1 | 0.23 | 0.60 | 0.10 | | Ordinary stud materials. |
| 2 | 1.70 | 2.00 | 0.60 | 0.10–0.50 | Present invention. |
| 3 | 1.70 | 2.00 | 0.60 | 0.50–1.50 | Do. |
| 4 | 1.70 | 2.00 | 0.6–1.50 | 0.10–0.50 | Do. |
| 5 | 1.70 | 2.00 | 0.6–1.50 | 0.50–1.50 | Do. |
| 6 | 1.70 | 2.0–5.0 | 0.60 | 0.10–0.50 | Do. |
| 7 | 1.70 | 2.0–5.0 | 0.60 | 0.50–1.50 | Do. |
| 8 | 1.70 | 2.0–5.0 | 0.6–1.5 | 0.10–0.50 | Do. |
| 9 | 1.70 | 2.0–5.0 | 0.6–1.5 | 0.50–1.50 | Do. |
| 10 | 1.70 | >5.0 | <1.5 | <1.50 | Mn, Excessive. |
| 11 | 1.70 | <5.0 | >1.5 | <1.50 | Si, Excessive. |
| 12 | 1.70 | <5.0 | <1.5 | <0.10 | Denitrogenizing elements, excessive. |
| 13 | 1.70 | <5.0 | <1.5 | >1.50 | Do. |

[1] Ti, Ce, Hf, Be, U, Al, B, Ta, Nb, La, Mg, Ca, V, etc.

FIGURE 5.—WELDING CONDITIONS AND NUMBER OF AIR-CELLS IN STUD WELDINGS

| | Diameter, mm. | Welding current, A. | Time | Number of air-cells in welded portion |
|---|---|---|---|---|
| Stud groups: | | | | |
| 1 | 8 | 450 | 12–16 | ([1]) |
| 2 | 8 | 450 | 12–16 | 0–1 |
| 3 | 8 | 450 | 12–16 | 0–1 |
| 4 | 8 | 450 | 12–16 | 0–2 |
| 5 | 8 | 450 | 12–16 | 0–3 |
| 6 | 8 | 450 | 12–16 | 0–2 |
| 7 | 8 | 450 | 12–16 | 0–3 |
| 8 | 8 | 450 | 12–16 | 0–4 |
| 9 | 8 | 450 | 12–16 | 0–5 |
| 10 | 8 | 450 | 12–16 | ([2]) |
| 11 | 8 | 450 | 12–16 | ([2]) |
| 12 | 8 | 450 | 12–16 | ([2]) |
| 13 | 8 | 450 | 12–16 | ([2]) |

[1] Innumerable.
[2] Many.

What is claimed as new and desired to be secured by Letters Patent is:

1. A steel welding electrode for unshielded electrode arc welding comprising 0.03–0.3% carbon

|   | Percent |
|---|---|
| Manganese | 0.4–3 |
| Silicon | 0.03–1.20 |
| Zirconium | 0.15–0.80 | and one or more additional denitrogenizing elements in an amount of 0.1–1%, the total of zirconium and denitrogenizing elements being below 1.5%.

2. The welding electrode of claim 1 wherein the additional denitrogenizing elements consist of the following: Ti, Ce, Hf, Be, U, Al, B, Ta, Nb, La, Mg, Ca or V.

3. The welding electrode of claim 1 wherein the total of zirconium and denitrogenizing elements is below 1%.

4. The welding electrode of claim 1 wherein the manganese is present in an amount between 0.3 and 2% and the silicon is present in an amount between 0.1 and 0.6%.

5. The welding electrode of claim 4 where the amount of silicon is between 0.1 and 0.3%.

6. A steel welding electrode for unshielded electrode arc welding comprising 0.03–3% carbon

|   | Percent |
|---|---|
| Manganese | 0.4–3 |
| Silicon | 0.03–1.20 |
| Zirconium | 0.2–0.35 | denitrogenizing elements between 0.1 and 0.5% and the total of zirconium and denitrogenizing elements being below 1%.

7. A steel welding electrode for unshielded electrode arc welding comprising

|   | Percent |
|---|---|
| Carbon | Traces to 0.2 |
| Manganese | 0.8 to 1.6 |
| Silicon | 0.1 to 0.3 |
| Zirconium | 0.05 to 0.3 | and one or more denitrogenizing elements selected from the group consisting of Ti, Ce, Hf, Be, U, Al, B, Ta, Nb, La, Mg, Ca and V, the said denitrogenizing elements being present in an amount from 0.1 to 0.3% and the total of zirconium and denitrogenizing elements being 0.2 to 0.35%.

8. The method of unshielded arc welding wherein a steel welding electrode as defined in claim 1 is used.

9. The method of unshielded arc welding wherein a steel welding electrode as defined in claim 7 is used.

References Cited

UNITED STATES PATENTS

| 1,350,317 | 8/1920 | Kingsbury | 219—145 X |
| 1,478,738 | 12/1923 | Holslag | 219—145 |
| 1,954,297 | 4/1934 | Reir | 219—145 X |

ANTHONY BARTIS, Primary Examiner

B. A. STEIN, Assistant Examiner